April 19, 1955

A. B. JACOBSEN 2,706,810

CODED DATA DECODER

Filed Sept. 18, 1945

TIME

INVENTOR
ANDREW B. JACOBSEN

BY Ralph L Chappell

ATTORNEY

United States Patent Office 2,706,810
Patented Apr. 19, 1955

2,706,810

CODED DATA DECODER

Andrew B. Jacobsen, Somerville, Mass., assignor, by mesne assignments, to the United States of America as represented by the Secretary of the Navy Application September 18, 1945, Serial No. 617,151

10 Claims. (Cl. 340—147)

This invention relates to a coded data transmission system and more particularly to a decoder for converting a series of code pulses of electrical energy having predetermined spacings into a single pulse which conveys the original data transmitted. This application is a continuation-in-part of patent application Serial Number 591,587, filed May 2, 1945, now Patent No. 2,482,544, for a "Pulse Code Operated Electronic Range Indicator."

Electromagnetic energy pulse transmission is now well-known to the art; numerous radiant energy echo ranging devices employ it as a basic principle of their operation. Recent developments in this field have included such radiant energy echo ranging devices carried aboard an aircraft, the information received by the aircraft from these devices being conveyed by supplementary relaying means to a ship or land station in order to increase the detection range of the ship or land station. Such a pulsed echo ranging device and relaying system is described more fully in patent application Serial Number 592,794, now Patent No. 2,698,931, for a "Synchronizer for Indicators," filed May 9, 1945, by Stanley N. Van Voorhis. In relaying such pulsed information it is important that military security be preserved and also that there be no confusion as a result of interference from a spurious source, such as atmospheric noise or other echo ranging systems. To achieve these desired results, there has been invented a system of coding and decoding such pulses, the details of the system as a whole and the coder itself being disclosed in copending application, Serial Number 617,365, filed September 19, 1945, for a "Coded Data Transmission System."

Accordingly, one object of this invention is to provide a decoding means for a coded data transmission system.

Another object is to provide a means for decoding a series of code pulses of electrical energy having predetermined spacings into a single pulse.

Figure 1:
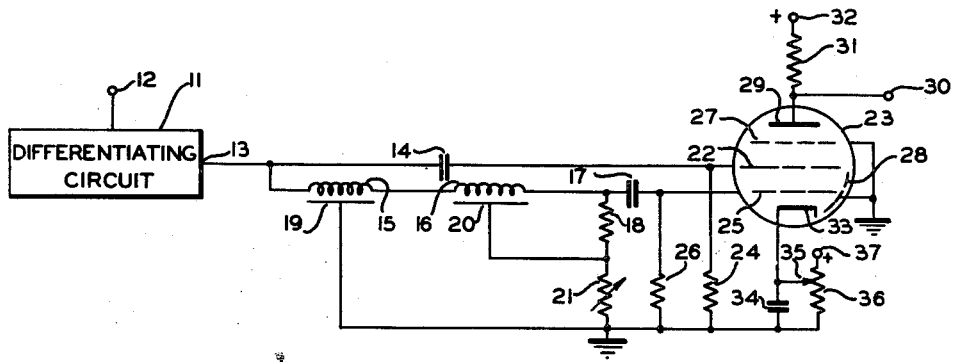
Figure 2:
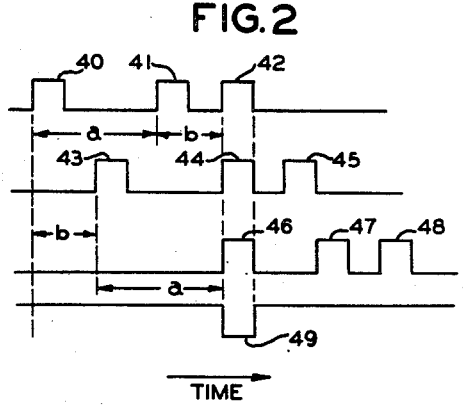
Figure 3:
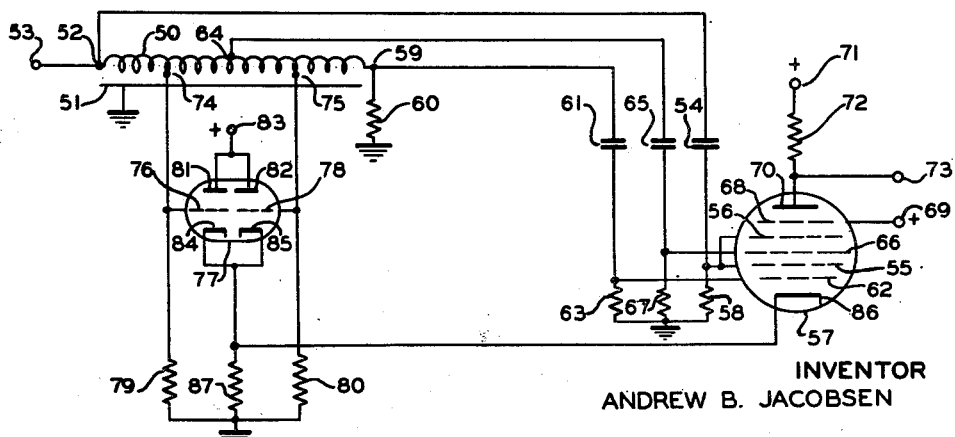

Other and further objects will appear in the course of the following description when taken with the accompanying drawings in which:

Fig. 1 shows one embodiment of this invention;
Fig. 2 shows the waveforms pertinent to Figs. 1 and 3, plotted as a function of time; and
Fig. 3 shows an alternative embodiment of this invention.

In Fig. 1 differentiating circuit 11 has an input 12 on which may be impressed any desired series of code pulses. The construction of this differentiating or peaker circuit is well-known to those skilled in the art and need not be given here; the purpose of this circuit will be given hereafter. To output 13 of differentiating circuit 11 is connected one terminal of coupling condenser 14 and one end of delay line 15. To the other end of delay line 15 is coupled one end of delay line 16, and to the other end of delay line 16 is connected one terminal of coupling condenser 17 and one end of resistor 18. Physically, each delay line is composed of a thin inductive coil surrounded by a cylindrical outer conductor which is represented in Fig. 1 by straight lines 19 and 20 under the coil symbols. Cylindrical outer conductor 19 is grounded and cylindrical outer conductor 20 is connected to the other end of resistor 18 and one end of variable resistor 21, the other end of variable resistor 21 being grounded also. The impedance of resistor 18 is made equal to the characteristic impedance of delay line 16 and the maximum impedance of resistor 21 is made from one-fourth to one-half this characteristic impedance. Resistor 21 is also made variable to facilitate adjustment of the relative magnitudes of the pulses passed by delay lines 15 and 16. To second grid 22 of pentode vacuum tube 23 is connected the other terminal of coupling condenser 14 and one end of grid resistor 24, the other end of this resistor being grounded. To first grid 25 of tube 23 is connected the other terminal of coupling condenser 17 and one end of grid resistor 26, the other end of this resistor also being grounded, as are third grid 27 and inner tube shield 28. Plate 29 of tube 23 is connected to output 30 of the decoder and also to one end of plate load resistor 31, the other end of this resistor being connected to a suitable source of plate voltage at terminal 32. Cathode 33 of tube 23 is connected to one terminal of cathode condenser 34, whose other terminal is grounded, and to slider 35 of potentiometer 36, whose end terminals are connected to ground and a suitable positive source of cathode biasing potential at terminal 37 respectively. As will be apparent to those skilled in the art, tube 23 functions in this circuit as a coincidence tube.

Referring now to Fig. 2 also, assume that a series of three pulses, each of one microsecond duration and represented by waveforms 40, 41, and 42 respectively, separated or delayed from one another by time intervals "a" and "b" as shown are impressed on input 12 of Fig. 1. Further assume that delay line 16 introduced a time delay of "a" microseconds, delay 15 introduces a time delay of "b" microseconds, and differentiating circuit 11 is so constructed that it will pass one microsecond pulse substantially unchanged, but will peak or differentiate pulses of any longer time duration into a single pulse of approximately one microsecond duration. This original series of three pulses will then be instantaneously impressed on second grid 22 through coupling condenser 14 and also applied to the input of delay line 15. "b" microseconds later a second series of pulses, represented by waveforms 43, 44, and 45 as shown in Fig. 2, will appear at the input to delay line 16 and instantaneously be capacity coupled to cylindrical outer conductor 20, producing a voltage drop across resistor 21 and simultaneously being coupled to first grid 25 through coupling condenser 17. "a" microseconds later a third series of pulses, represented by waveforms 46, 47, and 48 as shown in Fig. 2, will appear at the output of delay line 16, producing a voltage drop across resistors 18 and 21 and simultaneously being coupled to first grid 25 through coupling condenser 17. Referring to Fig. 2, it is apparent that only the pulses represented by waveforms 42, 44, and 46 are ever present simultaneously at the two grids of tube 23. By the proper selection of the magnitude of cathode potential at 37 and the position of slider 35, tube 23 can be biased so that it is conducting only when three pulses, such as those represented by waveforms 42, 44, and 46, are present at its two grids simultaneously. Under these conditions a pulse represented by waveform 49, negative because of the inverting action of tube 23, will appear at output 30. Thus this embodiment has achieved its purpose of decoding a series of three pulses separated by predetermined time spacings into a single pulse. As is apparent, differentiating circuit 11 prevents the decoder from responding to a single pulse of long duration and insures that it will respond only to the proper series of code pulses. It is to be noted that this embodiment can also be made responsive to a series of only two code pulses, as for example, pulses represented by waveforms 40 and 42 in Fig. 2 separated by a time interval "a" plus "b" as shown, by the proper adjustment of slider 35 so that tube 23 will conduct with only two pulses simultaneously applied to its grids.

In an alternative embodiment shown in Fig. 3, delay line 50, which may be of the same construction as that disclosed in Fig. 1, has its cylindrical outer conductor, represented by straight line 51 below the coil symbol, grounded. One end 52 of delay line 50 will be designated as input 53 of the decoder. End 52 is also connected to one terminal of coupling condenser 54, whose other terminal is connected to second grid 55 and fourth grid 56 of pentagrid vacuum tube 57 and to one end of grid resistor 58, the other end of this resistor being grounded. The other end 59 of delay line 50 is connected to one end of resistor 60 and to one terminal of coupling condenser 61, whose other terminal is connected to first grid 62 of tube 57 and to one end of grid resistor 63, the other end of this resistor being grounded. The other end of resistor 60, whose impedance is equal to the characteristic impedance of delay line 50, is also grounded. To some intermediate tap 64 on delay line 50 is connected one terminal of coupling condenser 65, whose other terminal is connected to third grid 66 of tube 57 and to one end of grid resistor 67, the other end of this resistor being grounded. The location of tap 64 on delay line 50 is determined by the code to be decoded. Fifth grid 68 of tube 57 is connected to a suitable source of positive potential at terminal 69 and plate 70 is connected to a suitable source of plate potential at terminal 71 through plate load resistor 72. From plate 70 is taken output 73 of the decoder. As will be apparent to those skilled in the art, tube 57 functions as a coincidence tube. In order to insure that the decoder will respond only to a specified code, two additional taps 74 and 75 are provided on delay line 50. Tap 74, which preferably is located half-way between end 52 and tap 64 of delay line 50 for the code hereafter described, is connected to one grid 76 of twin-triode vacuum tube 77, and similarly tap 75, which preferably is located half-way between end 59 and tap 64 of delay line 50 for the code hereafter described, is connected to other grid 78 of tube 77. Grids 76 and 78 are connected to ground through grid resistors 79 and 80 respectively and plates 81 and 82 are connected together and to a suitable source of plate potential at terminal 83. Cathodes 84 and 85 of tube 77 and cathode 86 of tube 57 are all connected together and to one end of common cathode resistor 87, the other end of this resistor being grounded. This circuit involving tube 77 and the inputs from taps 74 and 75 of delay line 50 constitutes a coincidence disabling circuit.

Referring now to Fig. 2 also, assume that the same series of code pulses as before (represented by waveforms 40, 41, and 42) are applied to input 53 of Fig. 3, and that delay line 50 is so constructed and tap 64 so located that a pulse passing from end 52 to tap 64 of delay line 50 will be delayed "$b$" microseconds and from tap 64 to end 59 "$a$" microseconds. The initial series of code pulses will of course enter delay line 50 at end 52 and also instantaneously be coupled to second and fourth grids 55 and 56 respectively of tube 57 through coupling condenser 54. "$b$" microseconds later a similar series of code pulses (represented by waveforms 43, 44, and 45) will appear at tap 64 and be coupled to third grid 66 of tube 57 through coupling condenser 65, and "$a$" microseconds after that another series of pulses (represented by waveforms 46, 47, and 48) will appear at end 59 of delay line 50 and be coupled to first grid 62 of tube 57 through coupling condenser 61. As will be seen from Fig. 2, this results in the pulses represented by waveforms 42, 44, and 46 being present simultaneously in time relationship at the grids of tube 57, producing an output pulse represented by waveform 49 (which is negative due to the inversion action of tube 57) at output 73 provided the cathode bias on tube 57 is not too high. This cathode bias is controlled by the voltage developed across cathode resistor 87, and this voltage is controlled in turn by the inputs to grids 76 and 78 of tube 77. If then, the pulse applied to input 53 of delay line 50 is as shown in Fig. 2 there will be no pulses present at taps 74 and 75 of delay line 50 at the instant the aforementioned three pulses appear simultaneously at the grids of tube 57, resulting in only a relatively low voltage appearing across cathode resistor 87. If, however, a single long pulse were applied to input 53, there would be a pulse present at taps 74 and 75 at that instant, resulting in tube 77 drawing more current due to the voltages applied to its grids 76 and 78, and increasing the voltage across cathode resistor 87. By suitable choice of circuit parameters, it can be arranged that tube 57 will conduct only when three pulses occur simultaneously at its grids and no pulse appears at either tap 74 or 75 of delay line 50. Then if a pulse did appear at either of these taps, tube 57 would be disabled from conducting. Thus it is insured that the decoder will respond only to a series of code pulses with predetermined spacings: in the case illustrated, three one microsecond pulses separated or delayed from one another by intervals of "$a$" and "$b$" microseconds respectively. This second embodiment has the advantage that by providing a number of taps on delay line 50 the code to which the decoder will respond can easily be changed. Additional tubes can of course be added as necessary to accommodate any desired number of pulses in a code. Further, this second embodiment could also be made to respond to a two pulse code by suitable choice of the circuit parameters in a manner similar to that above-mentioned with respect to the circuit of Fig. 1.

It is to be understood that while the operation of the above embodiments of this invention has been described with reference to a single series of pulses, the embodiments are operable with a plurality of successive series. Further, while specific embodiments have been described as required by the patent statutes, the principles of this invention are of much broader scope. Numerous additional specific applications, as, for example, employing multivibrators, will occur to those skilled in the art and no attempt has been made to exhaust such possibilities. The scope of the invention is defined in the following claims.

What is claimed is:

1. A decoder for converting a series of pulses of predetermined time duration separated by known time intervals into a single pulse comprising, means for delaying the first pulse of said series by an interval of time equal to that between the leading edges of the first and last pulses of said series so that said delayed first pulse occurs at the same instant of time as the last pulse of said series, means for delaying each intervening pulse by an interval of time equal to that between the leading edges of said intervening pulse and said last pulse, means responsive to said last, delayed intervening, and delayed first pulses to produce a single output pulse, and means responsive to pulse duration time to render said decoder nonresponsive to pulses having a time duration longer that said predetermined time duration.

2. A decoder for converting a series of pulses of predetermined time duration separated by known time intervals into a single pulse comprising, means for delaying the first pulse of said series by an interval of time equal to that between the leading edges of the first and last pulses of said series so that said delayed first pulse occurs at the same instant of time as the last pulse of said series, means for delaying each intervening pulse by an interval of time equal to that between the leading edges of said intervening pulse and said last pulse, means responsive to said last, delayed intervening, and delayed first pulses to produce a single output pulse, and means responsive to pulse duration time to render said decoder nonresponsive to pulses having a time duration substantially equal to said series of pulses.

3. A decoder for converting a series of pulses having a short time duration and separated by known time intervals into a single pulse comprising means for delaying each of the pulses of said series by an interval of time equal to that between the leading edges of each pulse and the last pulse of said series so that said delayed pulses occur at the same instant of time as said last pulse of said series, means responsive to said last pulse and said delayed pulses to produce a single output pulse, and means responsive to pulse duration time to render said decoder nonresponsive to pulses having a duration time substantially that of said series.

4. A decoder for converting a series of pulses of predetermined time duration separated by known time intervals into a single pulse comprising, means for delaying the first pulse of said series by an interval of time equal to that between the leading edges of the first and last pulses of said series so that said delayed first pulse occurs at the same instant of time as the last pulse of said series, mean for delaying each intervening pulse by an interval of time equal to that between the leading edges of said intervening pulse and said last pulse, means responsive to said last, delayed intervening, and delayed first pulses to produce a single output pulse, and differentiating means to convert single pulses having a time duration substantially equal to said series of pulses to a single pulse having a short time duration whereby said decoder is rendered nonresponsive to said single pulse of long time duration.

5. In a coded data transmission system, a decoder for converting a series of code pulses of electrical energy having predetermined spacings into a single pulse comprising, a delay line with a plurality of taps thereon, a coincidence tube circuit, an electron tube circuit adapted upon conduction to bias said coincidence tube to nonconduction, means for impressing a series of code pulses on the input of said delay line, means for connecting certain of said delay line taps to corresponding inputs of said coincidence tube circuit whereby said code pulses of predetermined spacings are applied in time coincidence, means for connecting intermediate delay line taps to said electron tube circuit whereby pulses having a time duration longer than said code pulses render said electron tube circuit conducting thereby biasing said coincidence tube to nonconduction at the time of application of said longer duration pulses to said coincidence tube circuit.

6. In a coded data transmission system, a decoder for converting a series of code pulses of predetermined time duration and separated by known time intervals into a single pulse comprising a delay line with a plurality of taps at spaced predetermined intervals thereon, means for impressing pulse signals on the input of said delay line, a coincidence circuit responsive to the simultaneous occurrence of pulse signals at selected taps along said delay line to produce an output signal pulse, and means responsive to the occurrence of signal pulses at any other tap along said delay line to render said coincidence circuit nonresponsive.

7. In a coded data transmission system, a decoder for converting a series of code pulses of predetermined time duration and spaced by known time intervals into a single pulse comprising a delay line with a plurality of taps at spaced predetermined intervals thereon, means for impressing code pulse signals on the input of said delay line, a coincidence circuit responsive to the simultaneous occurrence of pulse signals at taps along said delay line selected in accordance with said known time intervals to produce an output signal pulse, and means responsive to the occurrence of signal pulses at other taps along said delay line to render said coincidence circuit nonresponsive, whereby said coincidence circuit responds only to a coded series of pulses of predetermined time duration and spacing.

8. In a coded data transmission system, a decoder for converting a series of code pulses of electrical energy of predetermined time duration and spaced by known time intervals into a single pulse comprising a delay line with a plurality of taps at spaced predetermined intervals thereon, means for impressing code pulse signals on the input of said delay line, a coincidence circuit responsive to the simultaneous occurrence of pulse signals at a first group of selected taps along said delay line to produce an output signal pulse, and means responsive to the occurrence of signal pulses at a second group of taps intermediate the taps of said first group along said delay line to render said coincidence circuit nonresponsive, whereby said coincidence circuit responds only to a coded series of pulses of predetermined duration and spacing.

9. In a coded data transmission system, a decoder for converting a series of code pulses of electrical energy of predetermined time duration and spaced at known time intervals into a single pulse comprising a delay line with a plurality of taps at spaced predetermined intervals thereon, means for impressing code pulse signals on the input of said delay line, a coincidence circuit responsive to the simultaneous occurrence of pulse signals at a first group of taps along said delay line selected in accordance with said known time intervals to produce an output signal pulse, and means responsive to the occurrence of signal pulses at any other selected tap along said delay line to render said coincidence circuit nonresponsive, whereby said coincidence circuit responds solely to a coded series of pulses of predetermined duration and spacing.

10. A decoder for converting a series pulses of predetermined time duration separated by known time intervals into a single pulse, comprising means for delaying the first pulse of said series by an interval of time equal to that between the leading edges of the first and last pulses of said series so that said delayed first pulse occurs at the same instant of time as the last pulse of said series, means for delaying each intervening pulse by an interval of time equal to that between the leading edge of said intervening pulse and said last pulse, means responsive to said last, delayed intervening, and delayed first pulses to produce a single output pulse, and means for applying said series of pulses to said delay line through a differentiating circuit, said differentiating circuit having a critical time constant such that pulses of said predetermined time duration are coupled to said delay line without change and pulses of longer time duration are differentiated to produce peaked pulses of substantially said predetermined time duration whereby said decoder is rendered nonresponsive to a single pulse having a time duration substantially equivalent to the delay time of said first pulse.

References Cited in the file of this patent

UNITED STATES PATENTS

| | | |
|---|---|---|
| 1,924,795 | Lipman | Aug. 29, 1933 |
| 2,094,733 | Byrnes | Oct. 5, 1937 |
| 2,403,561 | Smith | July 9, 1946 |
| 2,415,359 | Loughlin | Feb. 4, 1947 |
| 2,418,127 | Labin | Apr. 1, 1947 |